(No Model.) 2 Sheets—Sheet 1.
W. P. & R. P. THOMPSON.
RADIATOR.
No. 536,768. Patented Apr. 2, 1895.
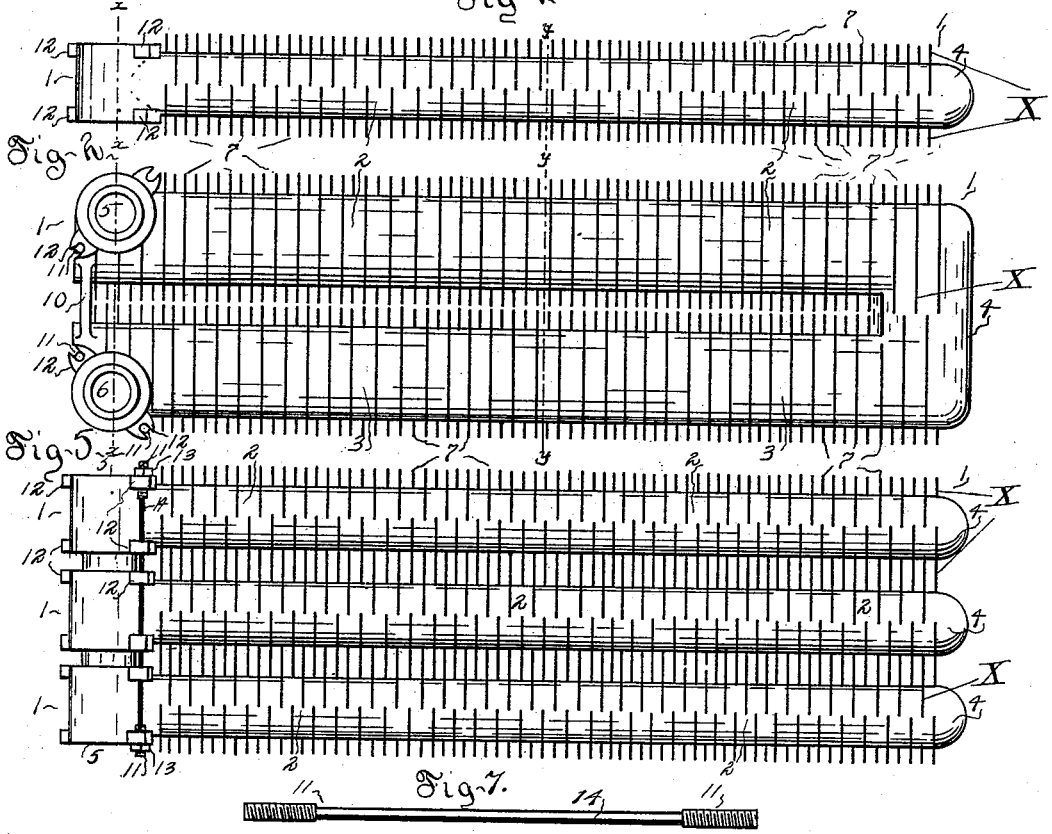
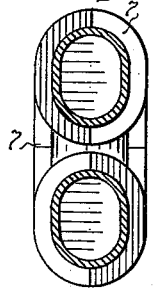
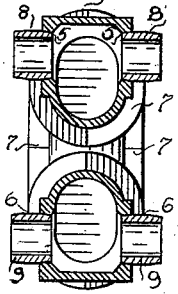
WITNESSES:
INVENTORS (No Model.) 2 Sheets—Sheet 2.
W. P. & R. P. THOMPSON.
RADIATOR.
No. 536,768. Patented Apr. 2, 1895.
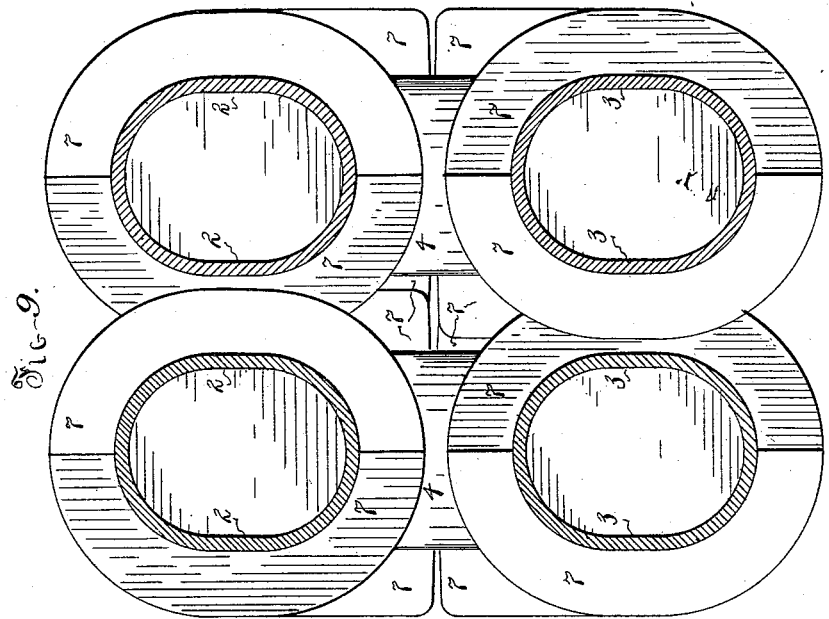
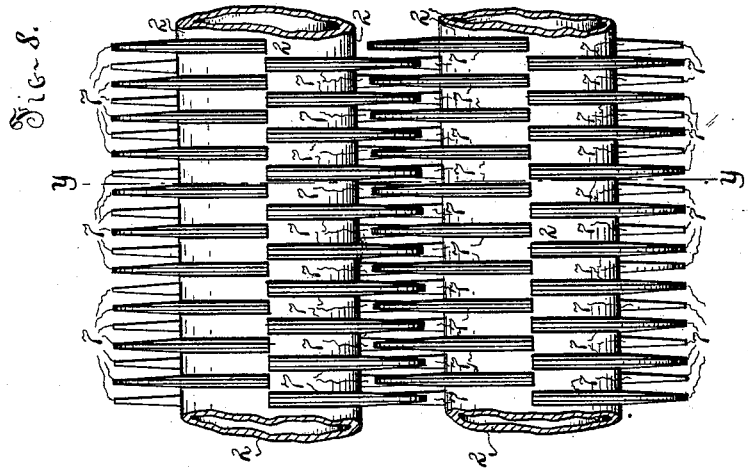
WITNESSES: INVENTORS

UNITED STATES PATENT OFFICE.

WILLIAM P. THOMPSON AND ROBERT P. THOMPSON, OF PHILADELPHIA, PENNSYLVANIA.

RADIATOR.

SPECIFICATION forming part of Letters Patent No. 536,768, dated April 2, 1895.

Application filed July 17, 1894. Serial No. 517,823. (No model.)

*To all whom it may concern:*

Be it known that we, WILLIAM P. THOMPSON and ROBERT P. THOMPSON, citizens of the United States, residing at Philadelphia, in the county of Philadelphia and State of Pennsylvania, have invented certain new and useful Improvements in Radiators for Heating Air; and we do hereby declare the following to be a sufficiently full, clear, and exact description thereof to enable others skilled in the art to make and use the said invention.

This invention relates to radiators for heating air for the purpose of warming and ventilating apartments by means of steam or hot water circulated inside the radiators, heating the same while air currents pass between and around outside of them.

The object of this invention is to produce a radiator of light weight and large conducting and radiating surfaces, which can be reversed in position in relation to adjoining radiator sections and therefore is incapable of being improperly assembled in erection. These ends are attained in this invention by making the radiating flanges of each radiator to occupy spaces between like flanges in adjacent radiators without contact therewith, in every possible position of erection, thus preventing any error in placing the radiators together and presenting heating surfaces to narrow spaces between them, for most intimate contact with the air.

We will now proceed to fully and particularly describe the mode of making and using the said invention, referring to the drawings annexed and numerals of reference marked thereon.

Figure 1, shows a plan of a radiator containing this invention; Fig. 2, a side elevation thereof; Fig. 3, a section in the plane indicated by the dotted line $y, y$, in Figs. 1 and 2; Fig. 4, a section in the plane indicated by the dotted line $x, x$, in Figs. 1 and 2; Fig. 5, a plan of a number of radiators assembled in a nest for use. Fig. 6, is an enlarged section of a tapering nipple used to connect the inlets and outlets of the radiators. Fig. 7, shows a preferred form of bolt for clamping together the radiators in nests. Fig. 8 shows an enlarged top view of parts of adjacent radiators illustrating the relative position of the projecting flanges thereon when assembled for use, and Fig. 9 shows a vertical transverse section of these parts on a like enlarged scale.

1 is a tube of cast metal, (preferably of oval or flattened section with the longer axes vertical) consisting of two horizontal limbs, 2 and 3, united by the bend 4, and having at its highest point or end an inlet 5, opening from both sides into the limb 2, and at its lowest point or other end an outlet 6, opening upon both sides from the limb 3. The axes of the inlet 5 and the outlet 6 are parallel, and the inlet and outlet are fitted with tapering or conical seats, on both sides.

Upon the sides of the limbs 2 and 3, and the bend 4 are formed projecting vertical flanges or webs 7, which serve to augment the heat conducting surfaces in contact with the air and brace the tubes 2 and 3, transversely without impairing their lengthwise elasticity. The limbs 2 and 3 being of elliptic cross section tend under internal pressure to assume a circular form and the flanges 7 formed integrally therewith resist such tendency.

The flanges 7 upon the limbs 2 and 3 are made continuous upon each side thereof from the center of the upper side to the center of the lower side of each limb. The flanges upon one side of each limb are located opposite the spaces between the flanges on the other side of the same limb, and also opposite the spaces of the same side of the other limb, and project such distance from the limbs 2 and 3, that under any position of assembling any two of such radiators, and connecting their inlets and outlets, all of the flanges of each will interspace without contact with each other or with the tubular part of the adjoining radiator, and by this construction a maximum of heating surface is procured, with least weight of metal, and such intimate contact of air with the heated metal is enforced, that the most efficient heating results. The relative position and porportions of the flanges to the tubular parts of the adjacent radiator required to produce this effect are shown in Figs. 8 and 9, the diminutive scale of Fig. 5 preventing such clear showing of the termination of the flanges on the upper limbs, because they are in Fig. 5 represented by single lines coincident in position with the single lines showing the flanges on the lower limb of the next radiator.

8 and 9 are nipples, or short tubes, made conical upon both ends and fitting accurately in the conical inlets 5 and outlets 6 of the radiators.

Preferably, between the limbs 2 and 3 near the inlet 5 and outlet 6, there is cast a thin web or brace of metal 10, which web during the operation of fitting the inlet 5 and outlet 6 serves to hold them in position and facilitates fitting of the openings with a correct parallelism of axes, also aids in handling and transporting them without breakage, and upon being severed, permits free play for the usual local expansion and elasticity of the limbs 2 and 3 when in use, and to allow the nipples 8 and 9 to remain forced home tightly in their places and thus maintain a perfectly fluid tight connection between the continuous inlets and outlets of the radiators as arranged in nests for use.

The nipples 8 and 9 may be fitted in apertures having single internal conical surfaces opposed to the external surfaces of the nipples, as shown in Figs. 4 and 6, but we do not limit this invention to any precise form of connection.

Lugs 12 are formed on each limb of the radiator, contiguous to the inlet and outlet openings 5 and 6, between which bolts 11 may be placed, and the radiators drawn tightly upon the nipples by means of nuts 13. A preferred form of bolt for this purpose is shown in Fig. 11, in which the shaft 14 of the bolt is made of less cross section than the threaded portion in order that a greater range of motion from elasticity and ductility of metal may be operative, which otherwise would be limited to that at the base of the threads between the nuts 13.

When erected for use, steam or hot water is admitted in the inlet 5 of the first radiator of the series or nest, the farther inlet of the last one being closed, and rapidly flows into all of the radiators of the nest, driving the air before it, and the condensed water or cooled water is discharged from the outlet 6, of one of the end radiators of the nest, the outlet 6 of the other end radiator being closed. In passing through the radiators the steam or hot water heats the radiator, which in turn heats the air, rising up between the projections or webs 7 and in contact with the limbs 2 and 3. By heating the several radiators of the nest simultaneously the strain from local expansion is greatly reduced, so as to be within the safe limits of elasticity of the material, and leaking of joints from this cause is avoided.

We are aware that radiators have been made in which a returning calculation was guided by internal partitions from and to parallel inlet and outlet openings; also that tubular radiators having limbs connected tubularly at both ends have been made. Such radiators differ from this invention in not being elastic between the inlet and outlet openings, and are hereby disclaimed; also that radiators with segmental projecting webs or flanges have been made, which interspace in one position of assembling, but collided with each other when reversed. Such radiators are not claimed as any part of this invention.

Having described our invention and the mode of constructing and operating the same, what we claim is—

In a reversible radiator for heating, two parallel tubular limbs tubularly united at one end only, and at the opposite end provided with means of connection with like radiators, in combination with transverse parallel flanges with intervening spaces alternating with like spaces in opposite sides and limbs, and arranged to enter said spaces without contact in similar adjacent radiators in reversible positions substantially as set forth.

WM. P. THOMPSON.
ROBT. P. THOMPSON.

Witnesses:
C. R. MORGAN,
LACEY L. CADWALLADER.